(12) United States Patent
Kubota et al.

(10) Patent No.: US 11,821,497 B2
(45) Date of Patent: Nov. 21, 2023

(54) PRELOAD DETECTABLE SCREW DEVICE

(71) Applicant: THK CO., LTD., Tokyo (JP)

(72) Inventors: Yuji Kubota, Tokyo (JP); Yoshinobu Moriyuki, Tokyo (JP)

(73) Assignee: THK CO., LTD, Tokyo (JP)

( * ) Notice: Subject to any disclaimer, the term of this patent is extended or adjusted under 35 U.S.C. 154(b) by 130 days.

(21) Appl. No.: 17/604,725

(22) PCT Filed: Mar. 17, 2020

(86) PCT No.: PCT/JP2020/011595
§ 371 (c)(1),
(2) Date: Oct. 18, 2021

(87) PCT Pub. No.: WO2020/213329
PCT Pub. Date: Oct. 22, 2020

(65) Prior Publication Data
US 2022/0042583 A1 Feb. 10, 2022

(30) Foreign Application Priority Data
Apr. 17, 2019 (JP) .................................. 2019-078275

(51) Int. Cl.
*F16H 25/20* (2006.01)
*F16H 25/22* (2006.01)
*F16H 25/24* (2006.01)

(52) U.S. Cl.
CPC .......... *F16H 25/2214* (2013.01); *F16H 25/24* (2013.01)

(58) Field of Classification Search
CPC ...... F16H 25/24; F16H 25/2204; F16H 25/22; F16H 25/2009; F16H 25/2006; F16H 25/2214; F16H 25/2015
See application file for complete search history.

(56) References Cited

U.S. PATENT DOCUMENTS

| 5,644,951 | A | 7/1997 | Hatamura | |
|---|---|---|---|---|
| 2014/0165759 | A1* | 6/2014 | Jeng | F16H 25/2006 74/424.81 |
| 2016/0121922 | A1* | 5/2016 | Fujita | B62D 5/0475 74/89.39 |

FOREIGN PATENT DOCUMENTS

| CN | 206592507 | 10/2017 |
|---|---|---|
| JP | H02 221747 | 9/1990 |

(Continued)

OTHER PUBLICATIONS

International Search Report for PCT/JP2020/011595 dated Jun. 9, 2020, 5 pages.

(Continued)

*Primary Examiner* — Zakaria Elahmadi
(74) *Attorney, Agent, or Firm* — NIXON & VANDERHYE

(57) ABSTRACT

A preload detectable screw device is provided which can detect preload with accuracy and can reduce the influence of generated heat on the output of a sensor. A screw device (1) includes a screw shaft (2), a nut member (3), a plurality of rolling elements (7, 8), at least one axial strain sensor (24) (B, D) that is attached to a surface of the nut member (3) and detects strain in an axial direction on the nut member (3), and at least one circumferential strain sensor (24) (A, C) that is attached to the surface of the nut member (3) and detects strain in a circumferential direction on the nut member (3). Preload of the screw device (1) is detected on the basis of outputs of the axial strain sensor (24) (B, D) and the circumferential strain sensor (24) (A, C).

11 Claims, 10 Drawing Sheets

(56) References Cited

FOREIGN PATENT DOCUMENTS

| JP | H05 141498 | 6/1993 | | |
|---|---|---|---|---|
| JP | 2001079886 A | * | 3/2001 | ............. F16H 25/22 |
| JP | 2008-175383 | | 7/2008 | |
| JP | 2014-168373 | | 9/2014 | |
| JP | 2016-223493 | | 12/2016 | |
| JP | 6561586 B2 | * | 8/2019 | ............. F16H 25/22 |

OTHER PUBLICATIONS

Written Opinion of the for PCT/JP2020/011595 dated Jun. 9, 2020, 3 pages.

* cited by examiner

PRELOAD DETECTABLE SCREW DEVICE

This application is the U.S. national phase of International Application No. PCT/JP2020/011595 filed 17 Mar. 2020 which designated the U.S. and claims priority to 2019-078275 filed 17 Apr. 2019, the entire contents of each of which are hereby incorporated by reference.

TECHNICAL FIELD

The present invention relates to a preload detectable screw device.

BACKGROUND ART

A screw device includes a screw shaft having a helical outer groove, and a nut member having a helical inner groove and a return path. The return path of the nut member is connected to a passage between the outer groove of the screw shaft and the inner groove of the nut member. The passage, together with the return path, configures a circulation path. A plurality of rolling elements is placed in the circulation path. When the screw shaft is rotated by, for example, a motor, the rolling elements roll between the outer groove of the screw shaft and the inner groove of the nut member, and circulate in the circulation path. The nut member then moves in an axial direction of the screw shaft.

Preload is applied to the screw device to increase the stiffness of the screw device and positioning accuracy. For example, double nut preloading, offset preloading, and oversized rolling element preloading are known as preloading of the screw device. In double nut preloading, two nuts are used and a spacer is placed between the two nuts to eliminate the axial clearance created between the nuts, the screw shaft, and the balls. In offset preloading, a part of the inner groove of the nut member is offset relative to another part of the inner groove of the nut member in the axial direction to eliminate the axial clearance. In oversized rolling element preloading, rolling elements that are larger than the passage between the outer groove of the screw shaft and the inner groove of the nut member are inserted into the passage to eliminate the axial clearance.

If the screw device is used for a long period of time, the rolling elements, the screw shaft, and the nut member are worn. If they are worn, the preload of the screw device decreases to reduce the stiffness of the screw device and positioning accuracy. Patent Literature 1 discloses a screw device of double nut preloading, which is a preload detectable screw device where a sensor that detects axial force is placed between two nuts to detect preload.

CITATION LIST

Patent Literature

Patent Literature 1: JP 2016-223493 A

SUMMARY OF INVENTION

Technical Problem

However, the screw device generates heat by use thereof. The preload detectable screw device described in Patent Literature 1 has a problem that the heat generated by the screw device has an adverse effect on the output of the sensor.

Hence, the present invention provides a preload detectable screw device that can detect preload with accuracy and reduce the influence of generated heat on the output of a sensor.

Solution to Problem

In order to solve the above problem, an aspect of the present invention is a preload detectable screw device including: a screw shaft having a helical outer groove; a nut member having a helical inner groove, and a return path connected to a passage between the outer groove and the inner groove; a plurality of rolling elements placed in a circulation path including the passage and the return path; at least one axial strain sensor attached to a surface of the nut member, the at least one axial strain sensor being configured to detect strain in an axial direction on the nut member; and at least one circumferential strain sensor attached to the surface of the nut member, the at least one circumferential strain sensor being configured to detect strain in a circumferential direction on the nut member, in which preload of the screw device is detected on the basis of outputs of the axial strain sensor and the circumferential strain sensor.

Advantageous Effects of Invention

Strain that causes the outer surface of the nut member to contract in the axial direction, and strain that causes the outer surface of the nut member to expand in the circumferential direction occur on the surface of the nut member due to the preload of the screw device. On the other hand, strain that causes the outer surface of the nut member to expand in the axial direction, and strain that causes the outer surface of the nut member to expand in the circumferential direction occur on the surface of the nut member due to the heat generated by the screw device. The preload of the screw device is detected on the basis of the outputs of the axial strain sensor and the circumferential strain sensor, the behavior of which is different between preload and generated heat. Accordingly, it is possible to increase the outputs of the sensors and detect preload with accuracy, and to reduce the influence of the generated heat on the output of a sensor.

DESCRIPTION OF EMBODIMENTS

Embodiments of a preload detectable screw device (hereinafter simply referred to as the screw device) of the present invention are described in detail below with reference to the accompanying drawings. However, the screw device of the present invention can be embodied in various modes, and is not limited to the embodiments described in the description. The embodiments are provided with the intention of allowing those skilled in the art to fully understand the scope of the invention by fully disclosing the description.

First Embodiment

Figure 1:
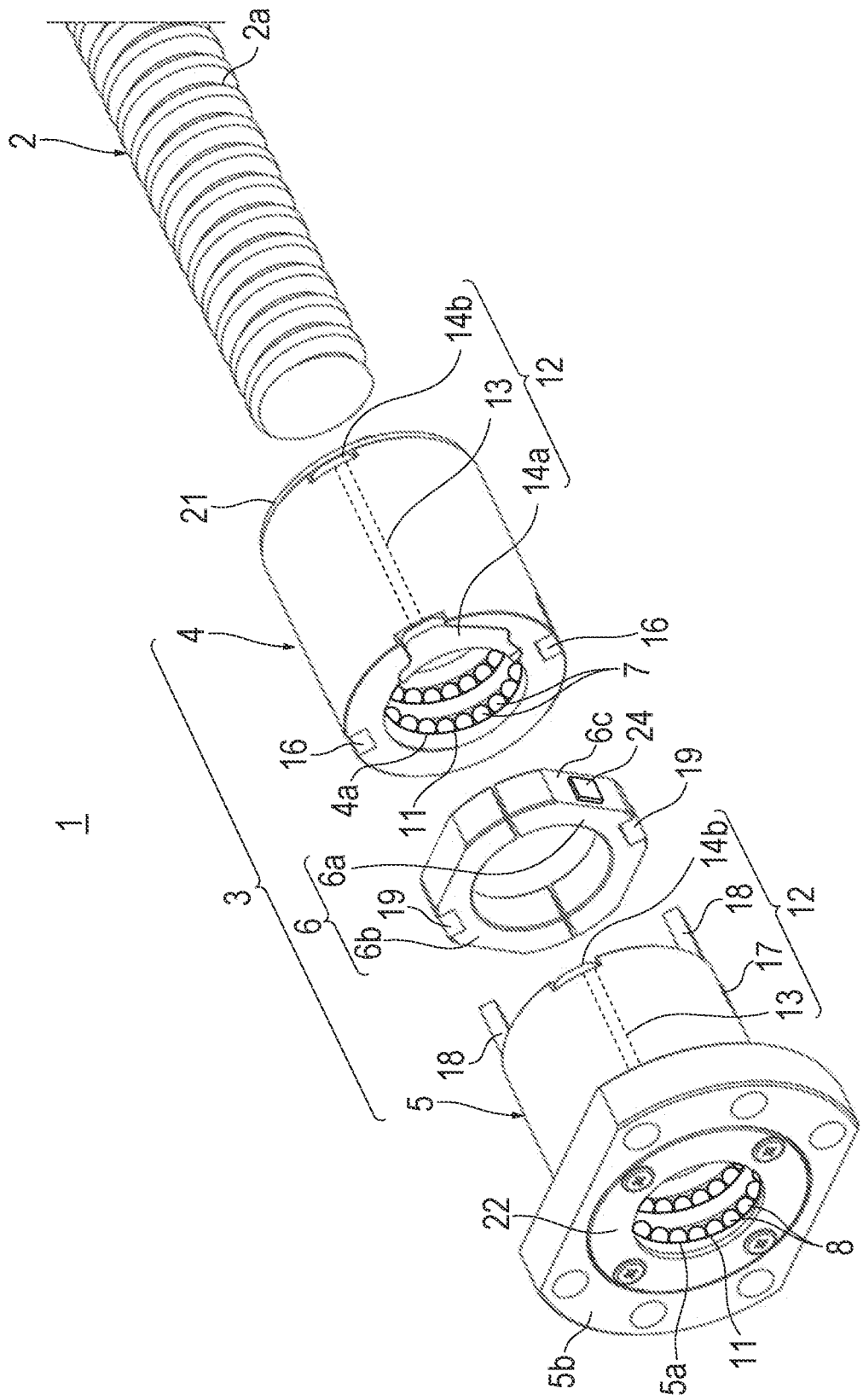
FIG. 1 is an exploded perspective view of a preload detectable screw device of a first embodiment of the present invention.

FIG. 1 illustrates an exploded perspective view of a screw device 1 of a first embodiment of the present invention. The screw device 1 includes a screw shaft 2 and a nut member 3. The nut member 3 includes two nuts 4 and 5, and a spacer 6 sandwiched between the two nuts 4 and 5. Preloading of the screw device 1 of the first embodiment is double nut preloading.

A helical outer groove 2a is formed in an outer surface of the screw shaft 2. Balls 7 and 8 as rolling elements roll in the outer groove 2a. A cross section of the outer groove 2a has a Gothic arch shape, or circular arc shape.

The two nuts 4 and 5 are assembled to the screw shaft 2. A hole where the screw shaft 2 penetrates is bored in the nuts 4 and 5. Inner grooves 4a and 5a facing the outer groove 2a of the screw shaft 2 are formed in inner surfaces of the nuts 4 and 5. Cross sections of the inner grooves 4a and 5a have a Gothic arch shape, or circular arc shape. The nut 5 is provided with a flange 5b for attachment to a counterpart component.

A helical passage 11 is formed between the outer groove 2a of the screw shaft 2 and the inner groove 4a of the nut 4. The nut 4 is provided with a return path 12 connected to one end and the other end of the passage 11 to allow the ball 7 to circulate therein. The passage 11 and the return path 12 configure a circulation path. A plurality of the balls 7 is placed in the circulation path in such a manner as to be capable of circulation.

In the embodiment, the return path 12 includes a through-hole 13 provided in the nut 4, and a pair of turn-around paths (circulation components 14a and 14b) connected to the through-hole 13 and the passage 11. The turn-around path is formed in the circulation components 14a and 14b that are attached to end surfaces of the nut 4 in the axial direction. The circulation component 14a scoops the balls 7 rolling in the passage 11 from the outer groove 2a of the screw shaft 2, and guides the balls 7 to the through-hole 13. The balls 7 that have passed through the through-hole 13 return to the passage 11 via the opposite circulation component 14b. The passage 11, the through-hole 13, and the turn-around path (the circulation component 14b) are also formed in the nut 5 likewise. It is also possible to form the return path 12 in a return pipe that is attached to each of the nuts 4 and 5.

Keyways 16 and 17 are formed in outer surfaces of opposing ends of the nuts 4 and 5. A key 18 as a coupling portion that couples the two nuts 4 and 5 in such a manner as to be incapable of relative rotation is fitted into the keyways 16 and 17. A keyway 19 where the key 18 fits is also formed in the spacer 6.

A ring-shaped cap 21 is attached to an end surface, which is opposite to the spacer 6, of the nut 4. Similarly, an end surface, which is opposite to the spacer 6, of the nut 5 is also blocked by a ring-shaped cap 22. The caps 21 and 22 are attached to the nuts 4 and 5 with fastening members such as screws.

The spacer 6 is sandwiched between the two nuts 4 and 5. The spacer 6 has a ring shape and includes a pair of divided bodies 6a and 6b having an arc shape with a central angle of approximately 180 degrees. The spacer 6 may not be divided.

A level flat portion 6c is formed on an outer surface of the spacer 6. A sensor 24 is attached to the flat portion 6c with bonding means such as an adhesive. The sensor 24 includes a pair of axial strain sensors B and D, and a pair of circumferential strain sensors A and C (refer to FIG. 4A), which are described in detail below. The axial strain sensors B and D and the circumferential strain sensors A and C detect strain in the axial direction and in the circumferential direction on the outer surface of the spacer 6 by use of the principle where a resistance value changes when a metal or semiconductor expands and contracts.

The type of the axial strain sensors B and D and the circumferential strain sensors A and C is not particularly limited. For example, a metal strain gauge where a metal resistor is attached on an insulator, a semiconductor strain gauge where a semiconductor is attached on an insulator, or a MEMS (Micro Electro Mechanical Systems) strain sensor produced by use of a semiconductor processing technology can be used.

Figure 2:
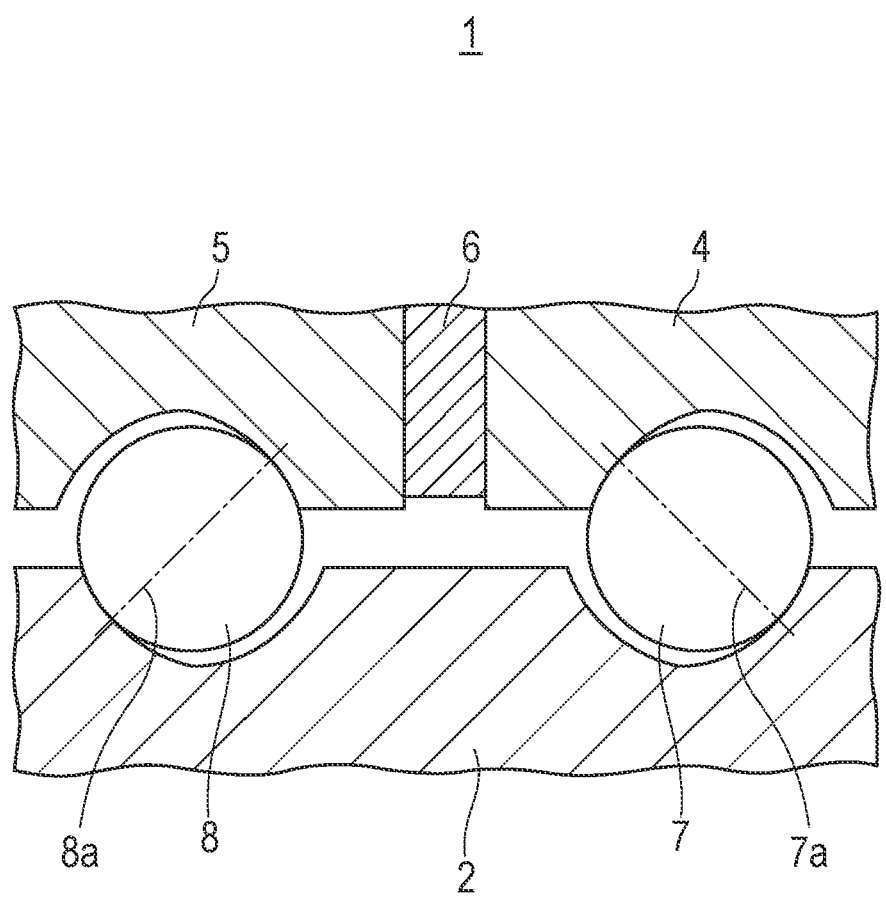
FIG. 2 is a partial cross-sectional view of the screw device for explaining the principle of double nut preloading.

FIG. 2 is a partial cross-sectional view of the screw device 1 for explaining the principle of double nut preloading. The spacer 6 is placed between the two nuts 4 and 5. The two nuts 4 and 5 are displaced in opposite directions. Then, it is possible to eliminate axial clearance created between the screw shaft 2, the balls 7 and 8, and the nuts 4 and 5. Reference signs 7a and 8a denote contact angle lines.

Figure 3A:
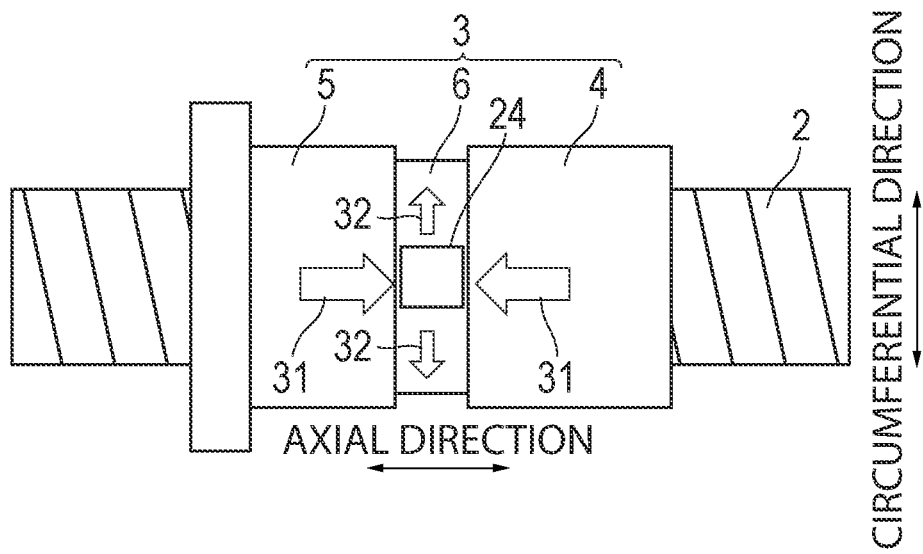
FIG. 3A is a schematic diagram illustrating the deformation of an outer surface of a spacer duce to double nut preload.

FIG. 3A is a schematic diagram illustrating the deformation of the outer surface of the spacer 6 due to double nut preload. Forces act on the spacer 6 in the directions of the contact angle lines 7a and 8a under double nut preload. Hence, strain 31 (compressive strain) that causes the outer surface of the spacer 6 to contract in the axial direction parallel to the screw shaft 2 occurs on the outer surface of the spacer 6. Moreover, the outer surface of the spacer 6 is deformed by the forces in the directions of the contact angle lines 7a and 8a in such a manner as to be protuberant. Accordingly, strain 32 (tensile strain) that causes the outer surface of the spacer 6 to expand in the circumferential direction occurs on the outer surface of the spacer 6. Furthermore, the strain 32 (tensile strain) that causes the outer surface of the spacer 6 to expand in the circumferential direction by Poisson's ratio of compressive load in the axial direction occurs on the outer surface of the spacer 6. The thicknesses of arrows of the strain 31 in the axial direction and the strain 32 in the circumferential direction indicate the magnitudes of strain. The strain 31 in the axial direction is greater than the strain 32 in the circumferential direction.

Figure 3B:
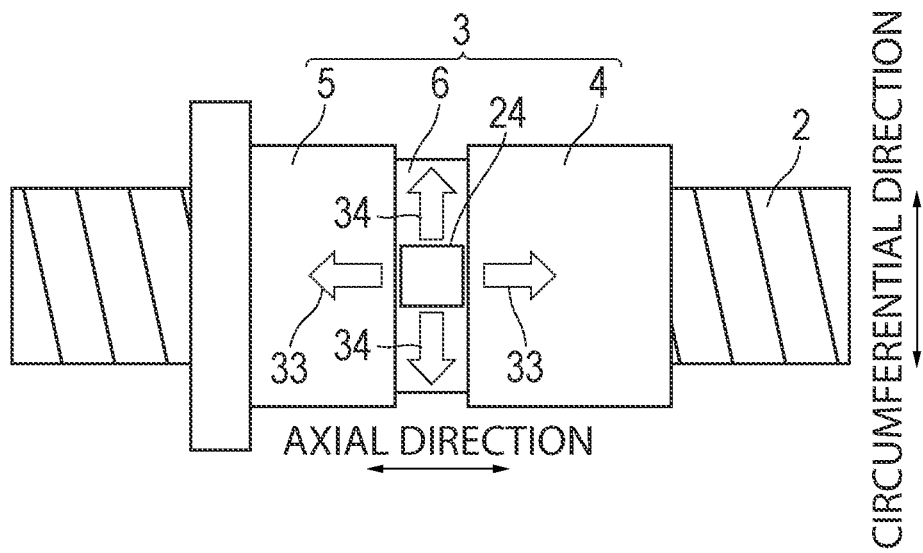
FIG. 3B is a schematic diagram illustrating the deformation of the outer surface of the spacer due to the generated heat.

FIG. 3B is a schematic diagram illustrating the deformation of the outer surface of the spacer 6 due to the heat generated by the screw device 1. On the other hand, a change in the dimension of the spacer 6 due to the generated heat occurs uniformly in the axial direction and in the circumferential direction. In other words, strain 33 (tensile strain) that causes the outer surface of the spacer 6 to expand in the axial direction, and strain 34 (tensile strain) that causes the outer surface of the spacer 6 to expand in the circumferential direction occur on the outer surface of the spacer 6 due to the generated heat. The magnitude of the strain 33 in the axial direction and the magnitude of the strain 34 in the circumferential direction are substantially the same.

Figure 4A:
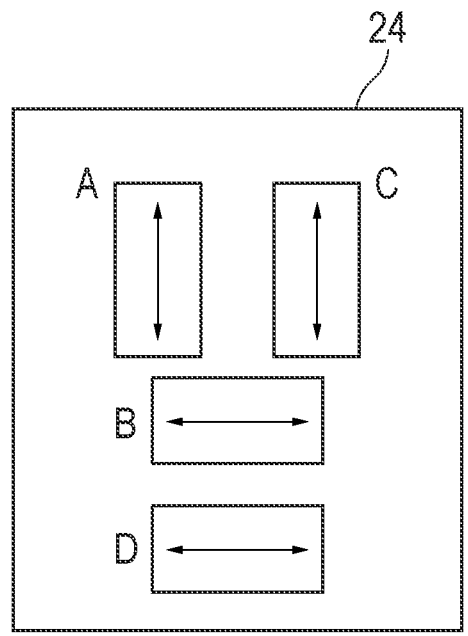
FIG. 4A is a schematic diagram illustrating configuration of a sensor.

FIG. 4A illustrates the pair of circumferential strain sensors A and C and the pair of axial strain sensors B and D, which are placed in the sensor 24. The circumferential strain sensors A and C are long in the circumferential direction, and detect strain in the circumferential direction on the outer surface of the spacer 6. The axial strain sensors B and D are long in the axial direction and detect strain in the axial direction on the outer surface of the spacer 6.

Figure 4B:
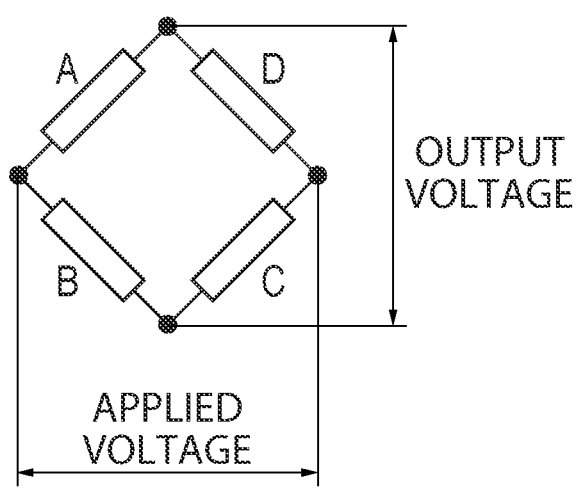
FIG. 4B is a diagram illustrating a bridge circuit.

FIG. 4B illustrates a bridge circuit 30 where the circumferential strain sensors A and C and the axial strain sensors B and D are incorporated. The bridge circuit 30 is an electric circuit where four resistors (the circumferential strain sensors A and C and the axial strain sensors B and D) are connected in series and form a rectangle. The pair of axial strain sensors B and D is placed on opposite sides of the bridge circuit 30. The pair of circumferential strain sensors A and C is placed on the other opposite sides of the bridge circuit 30. A power supply is connected to a pair of terminals facing each other on a diagonal line to apply a voltage thereto. An output voltage is taken out of the other pair of terminals. The output voltage is amplified by an unillustrated amplifier to be converted to a digital value by an A/D converter.

When an input voltage Vin is applied, an output voltage ΔV is expressed by the following general formula:

$$\Delta V = \left( \frac{R_C}{R_B + R_C} - \frac{R_D}{R_A + R_D} \right) V_{IN} \qquad [\text{Math. 1}]$$

where $R_A$ and $R_C$ are resistances of the circumferential strain sensors A and C, and $R_B$ and $R_D$ are resistances of the axial strain sensors B and D.

If the bridge circuit 30 is in equilibrium, that is, if $R_A = R_C = R_B = R_D = R$, then the output voltage ΔV is zero. When the axial strain sensors B and D experience compressive strain under preload to cause the resistances $R_B$ and $R_D$ change from R to R−ΔR$_1$ (resistance decreases under compressive strain), and the circumferential strain sensors A and C experience tensile strain under preload to cause the resistances $R_A$ and $R_C$ change from R to R+ΔR$_2$ (resistance increases under tensile strain), the output voltage ΔV of the bridge circuit 30 is expressed by Math. 2 below.

$$\Delta V = \left( \frac{R + \Delta R_2}{R - \Delta R_1 + R + \Delta R_2} - \frac{R - \Delta R_1}{R - \Delta R_1 + R + \Delta R_2} \right) V_{IN} \sim \qquad [\text{Math. 2}]$$

-continued
$$\frac{\Delta R_2 + \Delta R_1}{2R} V_{IN}$$

The changes in the resistances of the axial strain sensors B and D and the changes in the resistances of the circumferential strain sensors A and C are added up. Accordingly, it can be seen that the output of the sensor due to preload can be increased.

On the other hand, when the axial strain sensors B and D experience tensile strain by the generated heat to cause the resistances $R_B$ and $R_D$ change from R to R+ΔR$_1$, and the circumferential strain sensors A and C experience tensile strain by the generated heat to cause the resistances $R_A$ and $R_C$ change from R to R+ΔR$_2$, the output voltage ΔV of the bridge circuit 30 is expressed by Math. 3 below.

$$\Delta V = \left( \frac{R + \Delta R_2}{R + \Delta R_1 + R + \Delta R_2} - \frac{R + \Delta R_1}{R + \Delta R_1 + R + \Delta R_2} \right) V_{IN} \sim \qquad [\text{Math. 3}]$$

$$\frac{\Delta R_2 - \Delta R_1}{2R} V_{IN}$$

The changes in the resistances of the axial strain sensors B and D are subtracted from the changes in the resistances of the circumferential strain sensors A and C. Accordingly, it can be seen that the output of the sensor due to the generated heat can be reduced.

Table 1 is a summary of changes in the resistances of the axial strain sensors B and D and the circumferential strain sensors A and C.

TABLE 1

| Sensor Sign | A | B | C | D |
|---|---|---|---|---|
| Resistance change by preload | Up | Down | Up | Down |
| Resistance change by generated heat | Up | Up | Up | Up |

Figure 5:
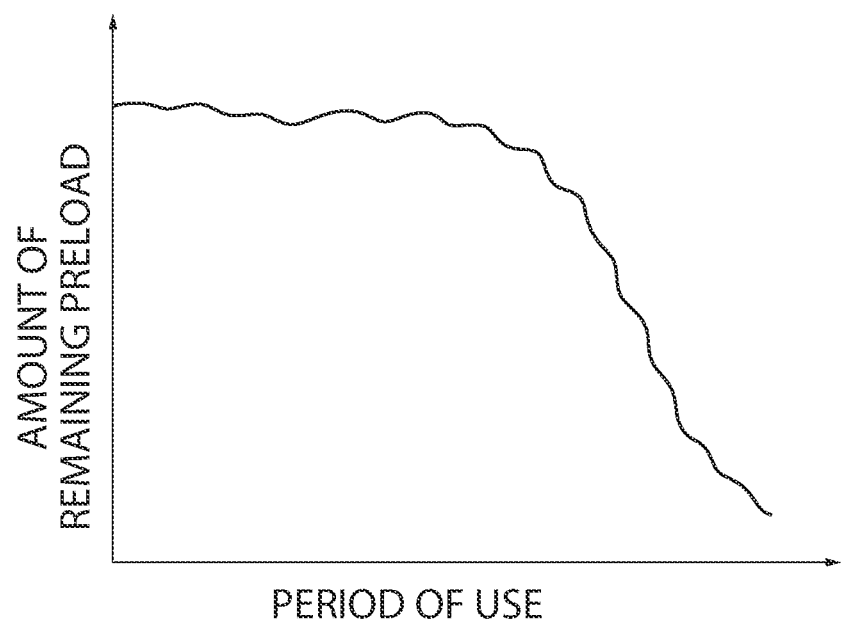
FIG. 5 is a graph illustrating the relationship between the period of use and the amount of remaining preload of the screw device.

FIG. 5 is a graph illustrating the relationship between the period of use and the amount of remaining preload of the screw device 1. If the screw device 1 is used for a long period of time, the balls 7 and 8, the screw shaft 2, and the nut member 3 are worn, and the preload of the screw device 1 decreases. If the preload decreases, strain on the outer surface of the spacer 6 decreases, and the output of the sensor 24 decreases. A comparison between an initial output of the sensor 24 and the output of the sensor 24 after a lapse of certain time enables detection of preload, that is, finding how much preload has decreased after a lapse of certain time.

A failure of the screw device 1 may be judged on the basis of a comparison between the output of the sensor 24 and a predetermined threshold, or the output of the sensor 24 may be machine-learned to judge a failure of the screw device 1. Moreover, the IoT may be introduced to transmit the output of the sensor 24 to a cloud through an Internet line by use of a transmitter.

Up to this point, the configuration of the screw device 1 according to the first embodiment has been described. The screw device 1 of the first embodiment exerts the following effects:

Preload is detected on the basis of the outputs of the axial strain sensors B and D and the circumferential strain sensors A and C, the behavior of which is different between preload and generated heat. As a result, it is possible to increase the output of the sensor 24 and detect preload with accuracy, and to reduce the influence of the generated heat on the output of the sensor 24.

The axial strain sensors B and D and the circumferential strain sensors A and C are incorporated into the bridge circuit 30. Accordingly, it is possible to amplify the output voltage based on preload and to cancel the output voltage based on the generated heat.

The axial strain sensors B and D and the circumferential strain sensors A and C are attached to the flat portion 6c of the spacer 6. Accordingly, it is easy to attach the axial strain sensors B and D and the circumferential strain sensors A and C to the nut member 3. Moreover, strain in the circumferential direction can be detected with accuracy. If the circumferential strain sensors A and C are attached on a circumferential surface of the spacer 6, the curvature of the circumferential surface, together with a bulge of the spacer 6, changes; accordingly, it is not easy to detect strain in the circumferential direction with accuracy.

Second Embodiment

Figure 6:
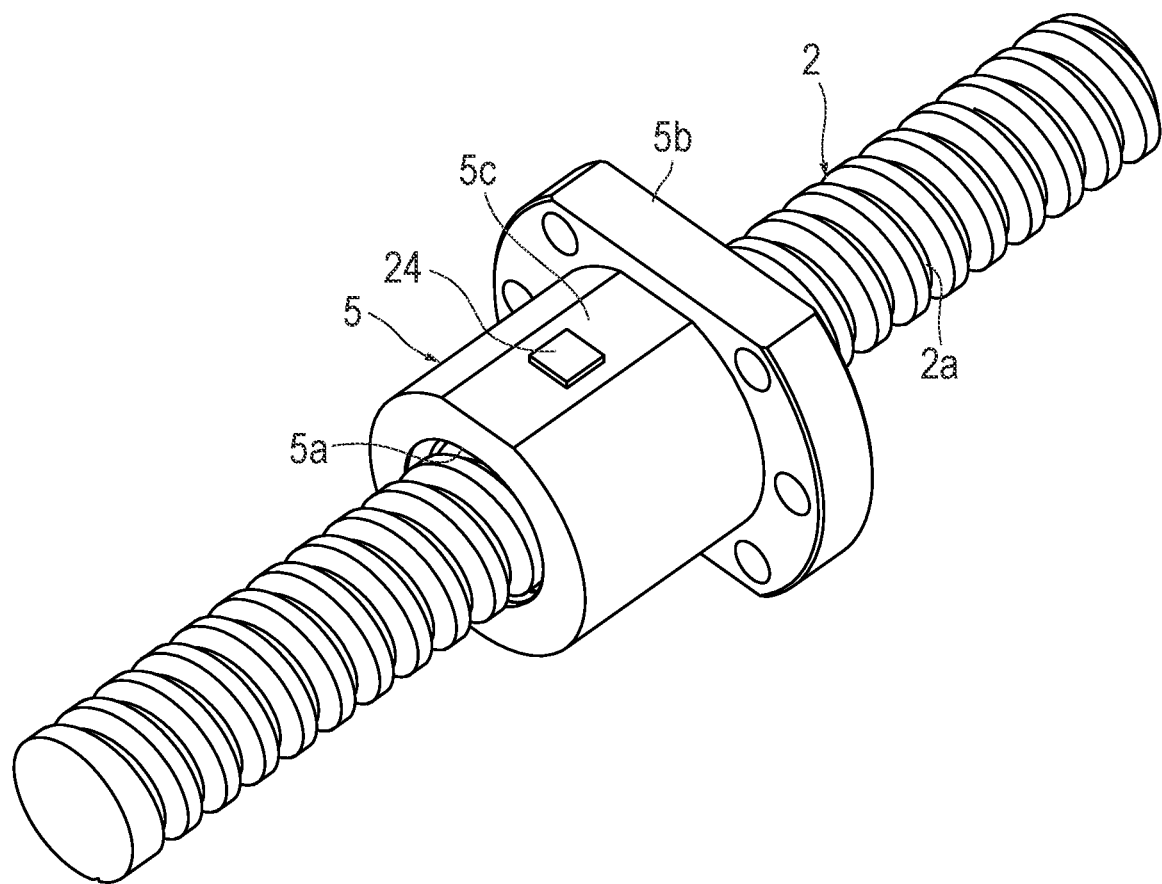
FIG. 6 is an external perspective view of a screw device of a second embodiment of the present invention.

FIG. 6 illustrates an external perspective view of a screw device 41 of a second embodiment of the present invention. The screw device 41 of the second embodiment includes a screw shaft 2 and a single nut member 5. Preloading of the screw device 41 is oversized rolling element preloading.

The configuration of the screw shaft 2 is substantially the same as that of the first embodiment. Accordingly, the same reference signs are assigned to the configuration of the screw shaft 2, and descriptions thereof are omitted. The basic configuration of the nut member 5 is substantially the same as that of the nut 5 of the first embodiment. Accordingly, the same reference signs are assigned to the configuration of the nut member 5, and descriptions thereof are omitted.

Figure 7A:
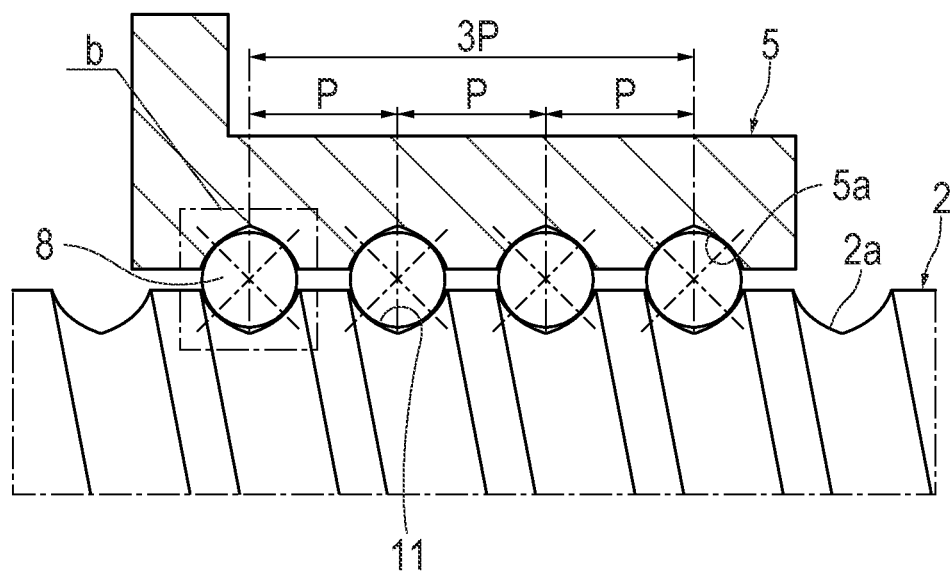
FIG. 7A is a partial cross-sectional view of the screw device for explaining the principle of oversized rolling element preloading.
Figure 7B:
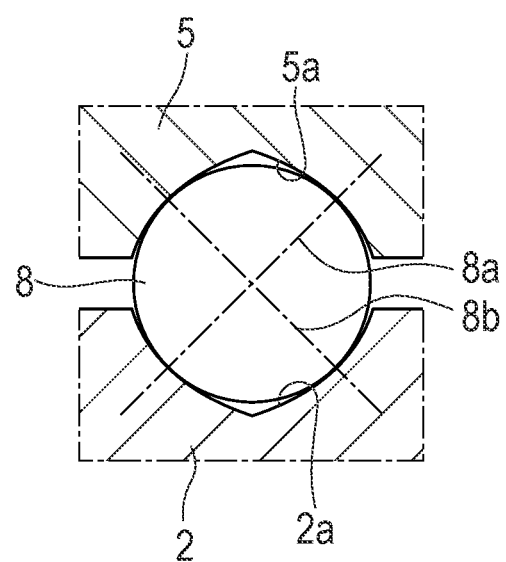
FIG. 7B is an enlarged view of a part b in FIG. 7A.

FIG. 7A is a partial cross-sectional view of the screw device 41 for explaining the principle of oversized rolling element preloading. Used as the ball 8 is an oversized ball 8 having a larger diameter than the passage 11 between the outer groove 2a of the screw shaft 2 and the inner groove 5a of the nut member 5. The ball 8 is compressed between the outer groove 2a and the inner groove 5a. Reference signs 8a and 8b in FIG. 7B denote contact angle lines. A pitch P of the outer groove 2a of the screw shaft 2 is substantially constant along the entire length of the outer groove 2a. A pitch P of the inner groove 5a of the nut member 5 is also substantially constant along the entire length of the inner groove 5a.

As illustrated in FIG. 6, the level flat portion 5c is formed on the outer surface of the nut member 5. The sensor 24 is attached to the flat portion 5c by bonding means such as an adhesive. The sensor 24 is placed on the outer surface of the nut member 5 between one end and the other end of the passage 11 in the axial direction (within an area indicated by 3P in FIG. 7A).

Figure 8A:
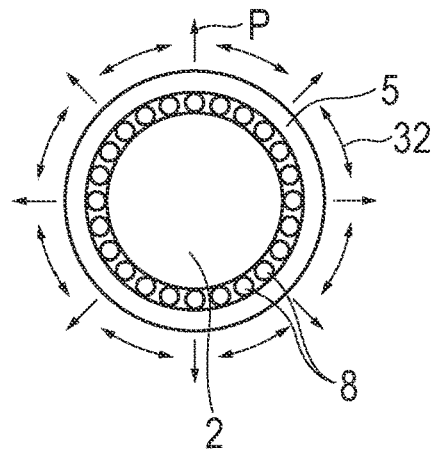
FIGS. 8A and 8B are schematic diagrams illustrating the deformation of an outer surface of a nut member due to oversized rolling element preload (FIG. 8A is a front view of the screw device, and FIG. 8B is a side view of the screw device)
Figure 8B:
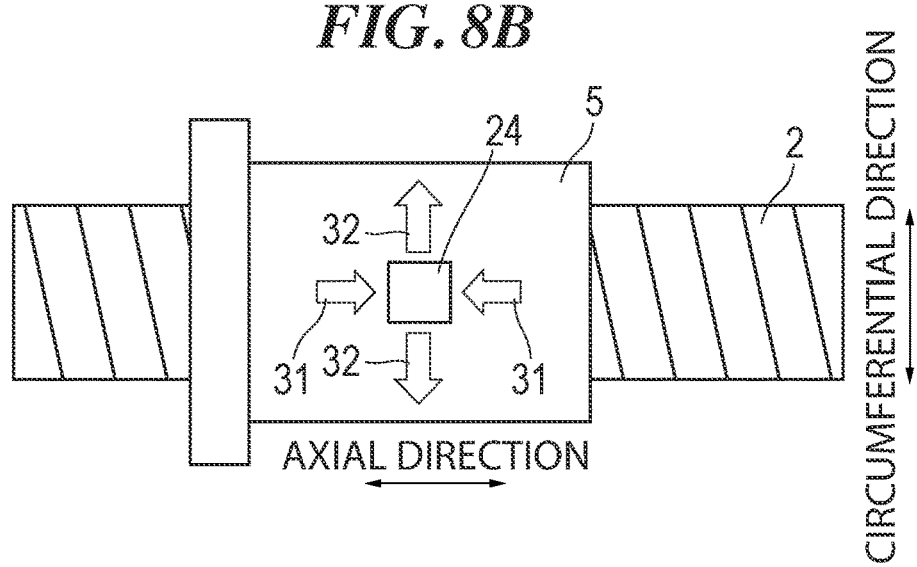

FIG. 8A is a schematic diagram illustrating the deformation of the outer surface of the nut member 5 due to oversized rolling element preload. As illustrated in FIG. 8A, a force P in the radial direction acts on the nut member 5 from the ball 8 under oversized rolling element preload. The nut member 5 deforms in such a manner that an outer peripheral portion thereof bulges. Hence, as illustrated in FIGS. 8A and 8B, the strain 32 (tensile strain) that causes the outer surface of the nut member 5 to expand in the circumferential direction occurs on the outer surface of the nut member 5. Moreover, the strain 31 (compressive strain) that causes outer surface of the nut member 5 to contract in the axial direction occurs by Poisson's ratio of the bulge of the outer peripheral portion of the nut member 5. The strain 32 in the circumferential direction is greater than the strain 31 in the axial direction.

Figure 8C:
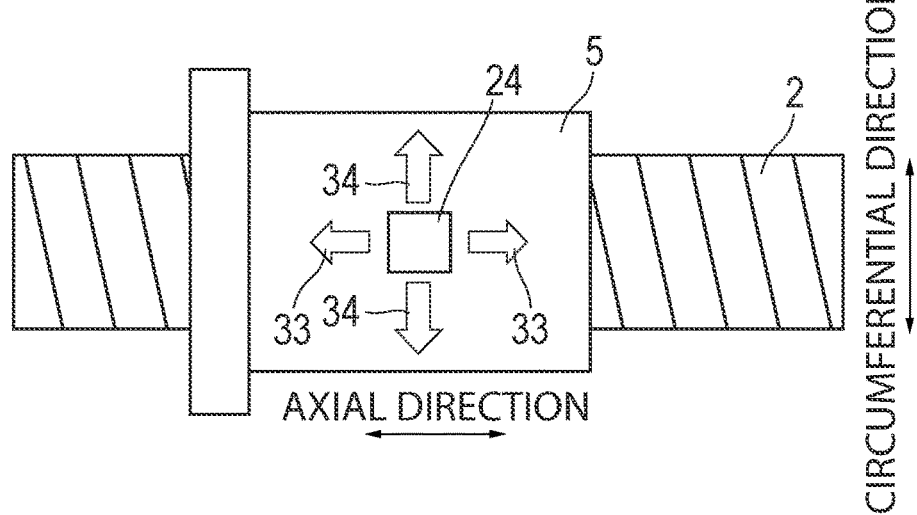
FIG. 8C is a schematic diagram illustrating the deformation of the outer surface of the nut member due to the generated heat.

FIG. 8C is a schematic diagram illustrating the deformation of the outer surface of the nut member 5 due to the generated heat. On the other hand, a change in the dimension of the nut member 5 due to the generated heat occurs uniformly in the axial direction and in the circumferential direction. The strain 33 in the axial direction and the strain 34 in the circumferential direction are substantially the same.

As in the screw device 1 of the first embodiment, the sensor 24 includes the pair of circumferential strain sensors A and C that detect strain in the circumferential direction on the outer surface of the nut member 5, and the pair of axial strain sensors B and D that detect strain in the axial direction on the outer surface of the nut member 5 (refer to FIG. 4A). The pair of axial strain sensors B and D is placed on opposite sides of the bridge circuit 30 (refer to FIG. 4B). The pair of circumferential strain sensors A and C is placed on the other opposite sides of the bridge circuit 30 (refer to FIG. 4B).

According to the screw device 41 of the second embodiment, preload is detected on the basis of the outputs of the axial strain sensors B and D and the circumferential strain sensors A and C, the behavior of which is different between preload and generated heat. Accordingly, it is possible to increase the output of the sensor 24 and detect preload with accuracy, and to reduce the influence of the generated heat on the output of the sensor 24.

Third Embodiment

Figure 9A:
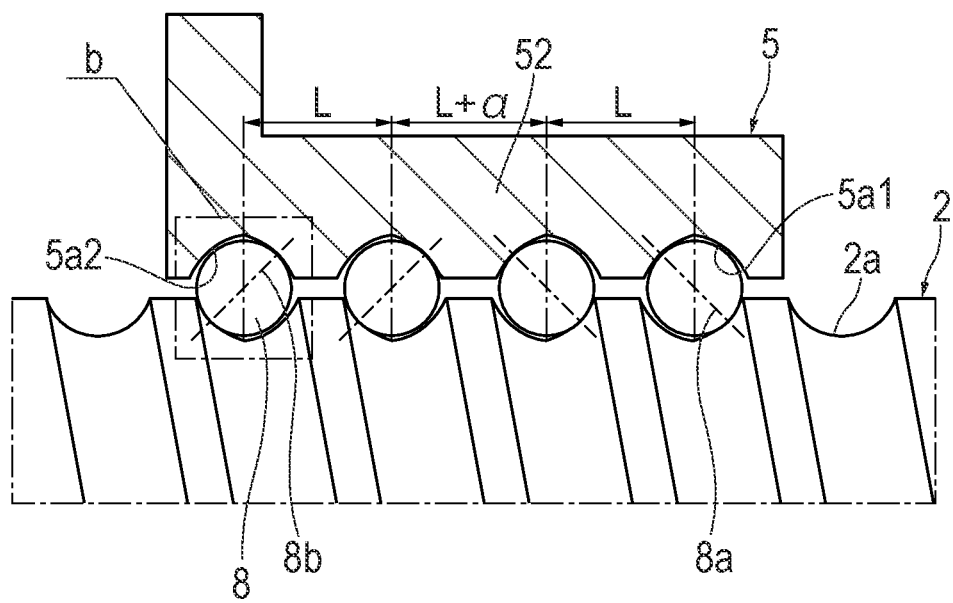
FIG. 9A is a partial cross-sectional view of a screw device of a third embodiment of the present invention (a diagram for explaining the principle of offset preloading)
Figure 9B:
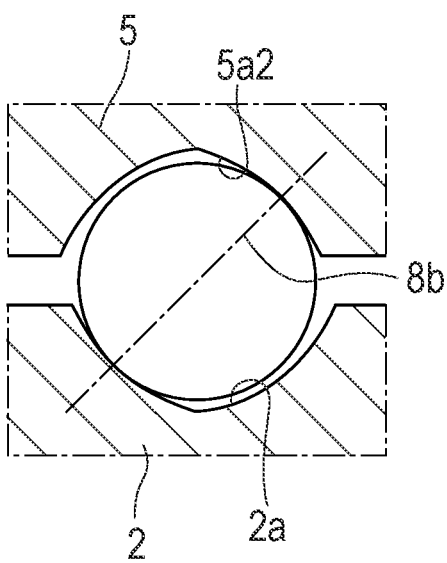
FIG. 9B is an enlarged view of a part b in FIG. 9A.

As illustrated in FIG. 9, a screw device 51 of a third embodiment includes a screw shaft 2 and a single nut member 5. The basic configuration of the screw device 51 of the third embodiment is substantially the same as that of the screw device 41 of the second embodiment. Preloading of the screw device 51 of the third embodiment is offset preloading.

The configuration of the screw shaft 2 is substantially the same as that of the first embodiment. Accordingly, the same reference signs are assigned to the configuration of the screw shaft 2, and descriptions thereof are omitted. The configuration of the nut member 5 is substantially the same as that of the nut member 5 of the screw device 41 of the second embodiment. Accordingly, the same reference signs are assigned to the configuration of the nut member 5, and descriptions thereof are omitted.

FIG. 9 is a diagram for explaining the principle of offset preloading. As illustrated in FIG. 9, a part 5a1 of the inner groove 5a of the nut member 5 is offset relative to another part 5a2 in the axial direction of the nut member 5. The lead of the part 5a1 of the inner groove 5a is L. The lead of the other part 5a2 of the inner groove 5a is L. The lead of an offset portion 52 between the part 5a1 and the other part 5a2 is L+α. Reference signs 8a and 8b denote contact angle lines. A circulation path including the part 5a1 of the inner groove 5a and a circulation path including the other part 5a2 of the inner groove 5a are away from each other in the axial direction. Offset preload may be applied between two rows of the inner grooves 5a.

The sensor 24 is attached to the flat portion 5c on the outer surface of the nut member 5 by bonding means such as an adhesive (refer to FIG. 6). The sensor 24 is placed on the offset portion 52 between the part 5a1 and the other part 5a2 of the inner groove 5a of the nut member 5 on the outer surface of the nut member 5.

Figure 10A:
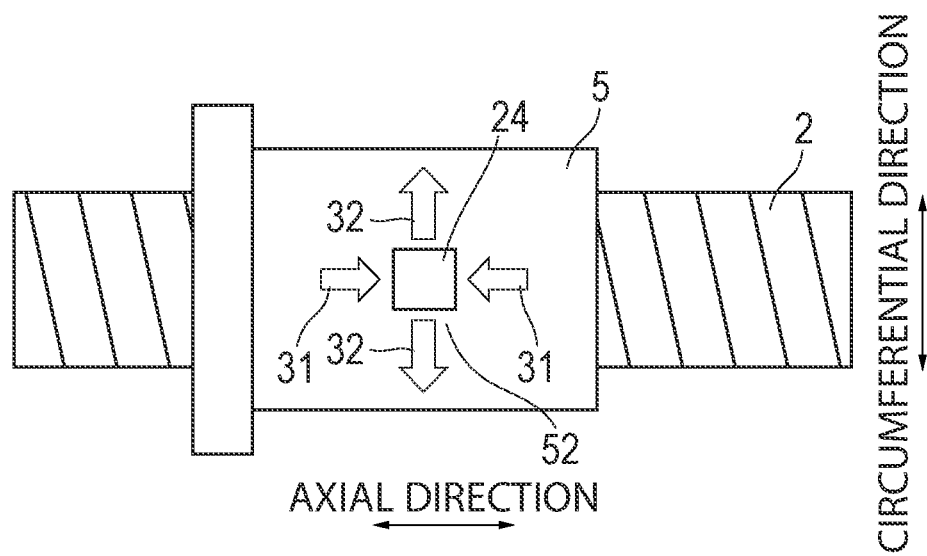
FIG. 10A is a schematic diagram illustrating the deformation of an outer surface of a nut member due to offset preload.

FIG. 10A is a schematic diagram illustrating the deformation of the outer surface of the nut member 5 due to offset preload. Load acts on the offset portion 52 of the nut member 5 in the directions of the contact angle lines 8a and 8b (refer to FIG. 9A). Hence, the strain 31 (compressive strain) that causes an outer surface of the offset portion 52 of the nut member 5 to contract in the axial direction occurs on the outer surface of the offset portion 52 of the nut member 5. Moreover, the strain 32 (tensile strain) that causes the outer surface of the offset portion 52 of the nut member 5 to expand in the circumferential direction occurs on the outer surface of the offset portion 52 of the nut member 5. The strain 32 in the circumferential direction caused by the offset preload is greater than the strain 32 (refer to FIG. 3A) in the circumferential direction caused by the double nut preload. This is because the nut member 5 is a single body.

Figure 10B:
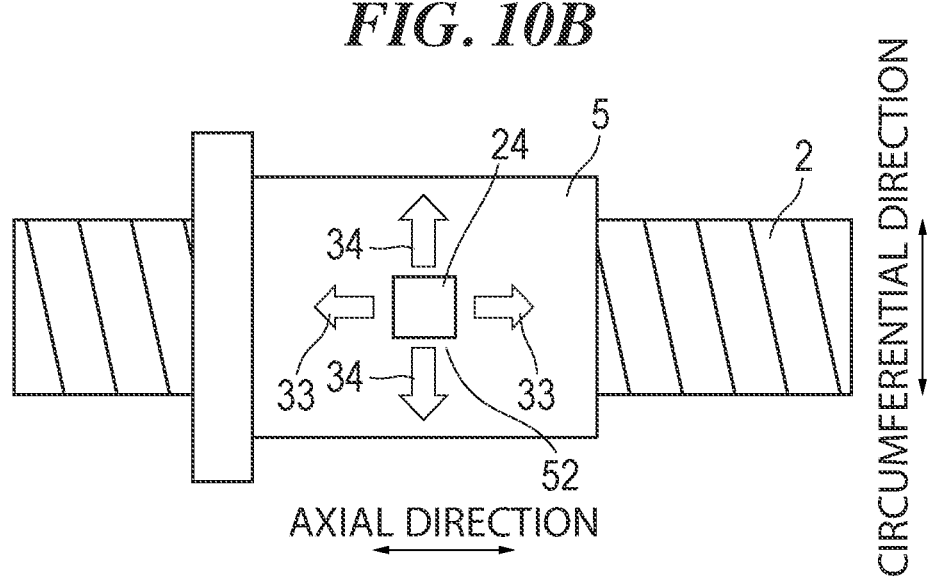
FIG. 10B is a schematic diagram illustrating the deformation of the outer surface of the nut member due to the generated heat.

FIG. 10B is a schematic diagram illustrating the deformation of the outer surface of the nut member 5 due to the generated heat. On the other hand, a change in the dimension of the nut member 5 due to the generated heat occurs uniformly in the axial direction and in the circumferential direction. The strain 33 in the axial direction and the strain 34 in the circumferential direction are substantially the same.

As in the screw device 1 of the first embodiment, the sensor 24 includes the pair of circumferential strain sensors A and C that detect strain in the circumferential direction on the outer surface of the nut member 5, and the pair of axial strain sensors B and D that detect strain in the axial direction on the outer surface of the nut member 5 (refer to FIG. 4A). The pair of axial strain sensors B and D is placed on opposite sides of the bridge circuit 30 (refer to FIG. 4B). The pair of circumferential strain sensors A and C is placed on the other opposite sides of the bridge circuit 30 (refer to FIG. 4B).

According to the screw device 51 of the third embodiment, preload is detected on the basis of the outputs of the axial strain sensors B and D and the circumferential strain sensors A and C, the behavior of which is different between preload and generated heat. Accordingly, it is possible to increase the output of the sensor 24 and detect preload with accuracy, and to reduce the influence of the generated heat on the output of the sensor.

The present invention is not limited to the above embodiments, and can be realized in other embodiments within the scope where the gist of the present invention is not changed. For example, a roller may be used as the rolling element instead of the ball.

In the screw device of double nut preloading of the above embodiment, the spacer is disposed between the two nuts. However, it is also possible to dispose a spring instead of the spacer. Moreover, the two nuts may be rotated in such a manner as to be fastened, and a fixing pin may be inserted into the two nuts to prevent the rotation of the two nuts. In this case, the sensor is placed at at least one of opposing ends of the two nuts.

In the above embodiments, the strain sensors are attached to the outer surface of the nut member. However, it is also possible to attach the strain sensors to the inner surface of the nut member.

In the above embodiments, the strain sensors are attached to the outer surface of the nut member. However, a hole may be bored in the outer surface of the nut member to place the sensor on a bottom surface of the hole.

The description is based on Japanese Patent Application No. 2019-078275 filed on Apr. 17, 2019, the entire contents of which are incorporated herein.

REFERENCE SIGNS LIST 1, 41, 51 Screw device
2 Screw shaft
2a Outer groove
3, 5 Nut member
4, 5 Nut
4a, 5a Inner groove
5a1 Part of the inner groove
5a2 Another part of the inner groove
5c, 6c Flat portion
6 Spacer
7, 8 Rolling element
11 Passage
12 Return path
30 Bridge circuit
52 Offset portion
A, C Circumferential strain sensor
B, D Axial strain sensor

The invention claimed is:

1. A preload detectable screw device comprising:
a screw shaft including a helical outer groove;
a nut member including a helical inner groove, and a return path connected to a passage between the outer groove and the inner groove;
a plurality of rolling elements disposed in a circulation path including the passage and the return path;
at least one axial strain sensor attached to a surface of the nut member, the at least one axial strain sensor being configured to detect strain in an axial direction on the nut member; and
at least one circumferential strain sensor attached to the surface of the nut member, the at least one circumferential strain sensor being configured to detect strain in a circumferential direction on the nut member, wherein
preload of the screw device is detected based on outputs of the axial strain sensor and the circumferential strain sensor,
a spacer is disposed between adjacent nuts to provide double nut preloading, and
the axial strain sensor and the circumferential strain sensor are disposed on an exposed outer surface of the spacer.

2. The preload detectable screw device according to claim 1, wherein the axial strain sensor and the circumferential strain sensor are incorporated into a bridge circuit.

3. A preload detectable screw device comprising:
a screw shaft including a helical outer groove;
a nut member including a helical inner groove, and a return path connected to a passage between the outer groove and the inner groove;
a plurality of rolling elements disposed in a circulation path including the passage and the return path;
at least one axial strain sensor attached to a surface of the nut member, the at least one axial strain sensor being configured to detect strain in an axial direction on the nut member; and
at least one circumferential strain sensor attached to the surface of the nut member, the at least one circumferential strain sensor being configured to detect strain in a circumferential direction on the nut member, wherein preload of the screw device is detected based on outputs of the axial strain sensor and the circumferential strain sensor, the screw device uses the rolling elements that are larger than the passage to provide oversized rolling element preloading, and the axial strain sensor and the circumferential strain sensor are disposed between one end and the other end of the passage in the axial direction on an outer or inner surface of the nut member.

4. A preload detectable screw device comprising:

a screw shaft including a helical outer groove;

a nut member including a helical inner groove, and a return path connected to a passage between the outer groove and the inner groove;

a plurality of rolling elements disposed in a circulation path including the passage and the return path;

at least one axial strain sensor attached to a surface of the nut member, the at least one axial strain sensor being configured to detect strain in an axial direction on the nut member; and at least one circumferential strain sensor attached to the surface of the nut member, the at least one circumferential strain sensor being configured to detect strain in a circumferential direction on the nut member, wherein preload of the screw device is detected based on outputs of the axial strain sensor and the circumferential strain sensor, a part of the inner groove of the single nut member is offset relative to another part of the inner groove in the axial direction of the nut member to provide offset preloading, and the axial strain sensor and the circumferential strain sensor are disposed on an offset portion between the part and the other part of the inner groove on an outer or inner surface of the nut member.

5. The screw device according to claim 1, wherein the axial strain sensor and the circumferential strain sensor are attached to a level flat portion of the nut member.

6. The screw device according to claim 2, wherein the axial strain sensor and the circumferential strain sensor are attached to a level flat portion of the nut member.

7. The screw device according to claim 3, wherein the axial strain sensor and the circumferential strain sensor are attached to a level flat portion of the nut member.

8. The screw device according to claim 4, wherein the axial strain sensor and the circumferential strain sensor are attached to a level flat portion of the nut member.

9. The preload detectable screw device according to claim 3, wherein the axial strain sensor and the circumferential strain sensor are incorporated into a bridge circuit.

10. The preload detectable screw device according to claim 4, wherein the axial strain sensor and the circumferential strain sensor are incorporated into a bridge circuit.

11. The preload detectable screw device according to claim 5, wherein the axial strain sensor and the circumferential strain sensor are incorporated into a bridge circuit.

* * * * *